Figure 1:
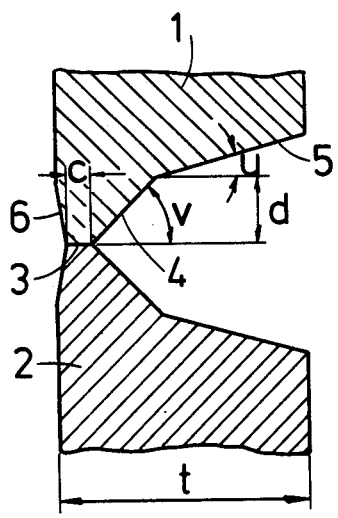

United States Patent [19]

Knipstrom et al.

[11] 4,142,085
[45] Feb. 27, 1979

[54] METHOD FOR TUBE WELDING

[75] Inventors: Karl-Erik Knipström; Anders L. Malm, both of Laxå; Bror H. Andersson, Askersund, all of Sweden

[73] Assignee: Elektriska Svetsningsaktiebolaget, Gothenburg, Sweden

[21] Appl. No.: 762,991

[22] Filed: Jan. 27, 1977

[30] Foreign Application Priority Data

Feb. 6, 1976 [SE] Sweden ............................... 7601302

[51] Int. Cl.$^2$ .............................................. B23K 9/00
[52] U.S. Cl. ..................................... 219/61; 219/126; 219/137 R
[58] Field of Search ...................... 219/59, 60 A, 60 R, 219/61, 126, 137 R, 137 PS, 135, 131 R, 131 F, 130.51

[56] References Cited

U.S. PATENT DOCUMENTS

| 3,350,539 | 10/1967 | Manz et al. ................... 219/131 R |
| 3,679,866 | 7/1972 | Arikawa et al. ............... 219/137 R |
| 3,727,025 | 4/1973 | Dibenedetto .................. 219/60 A |
| 3,737,614 | 6/1973 | Paulange ....................... 219/131 F |
| 3,922,517 | 11/1975 | Nelson et al. ................. 219/61 |

OTHER PUBLICATIONS

T. Lyman, Ed., "Welding & Brazing" vol. 6 of *Metals Handbook*, 1974; pp. 33, 150.

*Primary Examiner*—J. V. Truhe
*Assistant Examiner*—Clifford C. Shaw
*Attorney, Agent, or Firm*—Lerner, David, Littenberg & Samuel

[57] ABSTRACT

A method for butt welding a pair of vertically disposed tubular members having a wall thickness of more than 12 mm in end-to-end relationship by multi-pass shielded arc welding with a consumable electrode, comprising the steps of preparing the opposed edges of the tubular members by forming a root face the width of which being in the range of 0.5 mm to 3.0 mm and beveling the edges adjacent to the root face to a bevel angle in the range of 40° to 50°, coaxially aligning said tubular members so that the gap between the root faces is not larger than 1.5 mm, performing a root pass by continuously feeding an electrode having a diameter not larger than about 1.0 mm into the groove between the prepared edges supplying a shielding gas consisting of 0-40% carbon dioxide and the balance argon, energizing an arc between the electrode and the root face alternately changing the voltage supplied to the arc between a low value and a high value, adjusting the low voltage to produce a droplet metal transfer during short circuit periods, adjusting the high voltage to produce a spray metal transfer, adjusting the welding speed and the electrode feeding speed to deposit metal in the groove in the range of 0.15 to 0.35 grams per mm length of the pass, and successively depositing overlapping passes for filling the groove.

8 Claims, 5 Drawing Figures

METHOD FOR TUBE WELDING

BACKGROUND OF THE INVENTION

The invention relates to methods for welding tubular members in general and particularly to a method of butt welding a pair of vertically disposed ferrous tubular members having a wall thickness of more than 12 mm in end-to-end relationship by multi-pass gas-shielded arc welding with a consumable electrode from the outside of the tubular members without using a backing member.

When drilling wells e.g. offshore wells, vertically disposed tubes of substantial length are used to prevent materials as water, soil etc. to be introduced into the well and to remove other materials as oil from the drill hole.

The tube inserted into a drill hole consists of short tube sections welded together on site in end-to-end relationship. Until now manual welding methods were predominant requiring much time and high-qualified workers. However, the manually made welds are not of uniform quality. Therefore great efforts have been made to automate the welding operation which is a requirement for a perfect weld.

It has been proposed to improve the weld quality by preparing the opposed edges of the tube sections in a special manner before welding. Accordingly, the edge of the upper tube is beveled forming a conical surface inclined inwardly and downwardly at a bevel angle of appr. 45° to the tube axis. The lower tube has a square edge or is beveled, thereby forming a conical surface inclined inwardly at a bevel angle of appr. 15°. No root face is provided. The alignment of the two tubes is facilitated by the use of a backing member on the inner surface of the tubes. The backing member is welded together with the tubes and forms an integral part of the weld, thereby diminishing the inner section area of the tube. Submerged arc welding is used to join the tubes.

Disadvantages of the known welding methods are high costs, poor quality, binding defects at the flanks of the groove and the root, and poor dimensional accuracy of the inner section area of the tube near the weld.

SUMMARY OF THE INVENTION

It is an object of the present invention to provide an improved method of butt welding a pair of vertically disposed tubular members. It is a further object of the invention to provide a method for depositing perfect welds with a consumable electrode without using a backing member on the inside of the tubes, thereby achieving a high dimensional accuracy and facilitating the welding operation.

Particularly, it is an object of the present invention to provide a method of butt welding a pair of vertically disposed, ferrous, tubular members having a wall thickness of more than 12 mm in end-to-end relationship by multi-pass gas-shielded arc welding with a consumable electrode from the outer side of the tubular members without using a backing member, comprising the steps of preparing the opposed edges of the tubular members by forming a root face on the opposed edges the width of which being in the range of 0.5 to 3.0 mm, beveling the edges adjacent to the root face to a bevel angle in the range of 40° to 50°, coaxially aligning said tubular members so that the root faces of each of said tubular members are disposed in closely spaced relationship opposite and facing one another, thereby forming a groove, the gap between the root faces being not larger than 1.5 mm, performing a root pass by continuously feeding the electrode into the groove with its tip parallel with the root face, the diameter of said electrode being not larger than about 1.0 mm, supplying shielding gas consisting of 0–40% carbon dioxide and the balance argon, energizing an arc between the electrode and the root face alternately changing the voltage supplied to the arc between a low value and a high value at a frequency of alternation in the range of 0.5 to 2.0 Hz, adjusting the low voltage to produce a droplet transfer of the metal from the electrode into the groove during short-circuit periods, adjusting the high voltage to produce a spray transfer of the metal, adjusting the welding speed and the electrode feeding speed to deposit metal in the groove in the range of 0.15 to 0.35 grams per mm length of the pass, and successively depositing overlapping passes for filling the groove.

Figure 2:
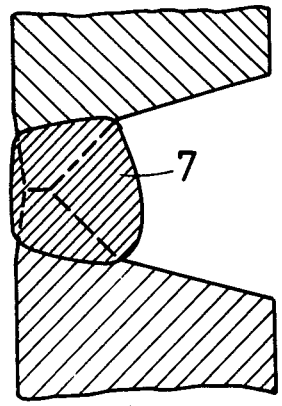
Figure 3:
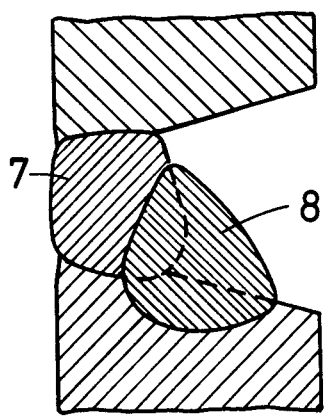
Figure 4:
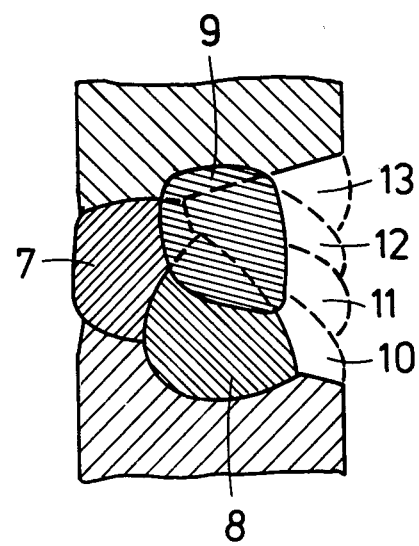
Figure 5:
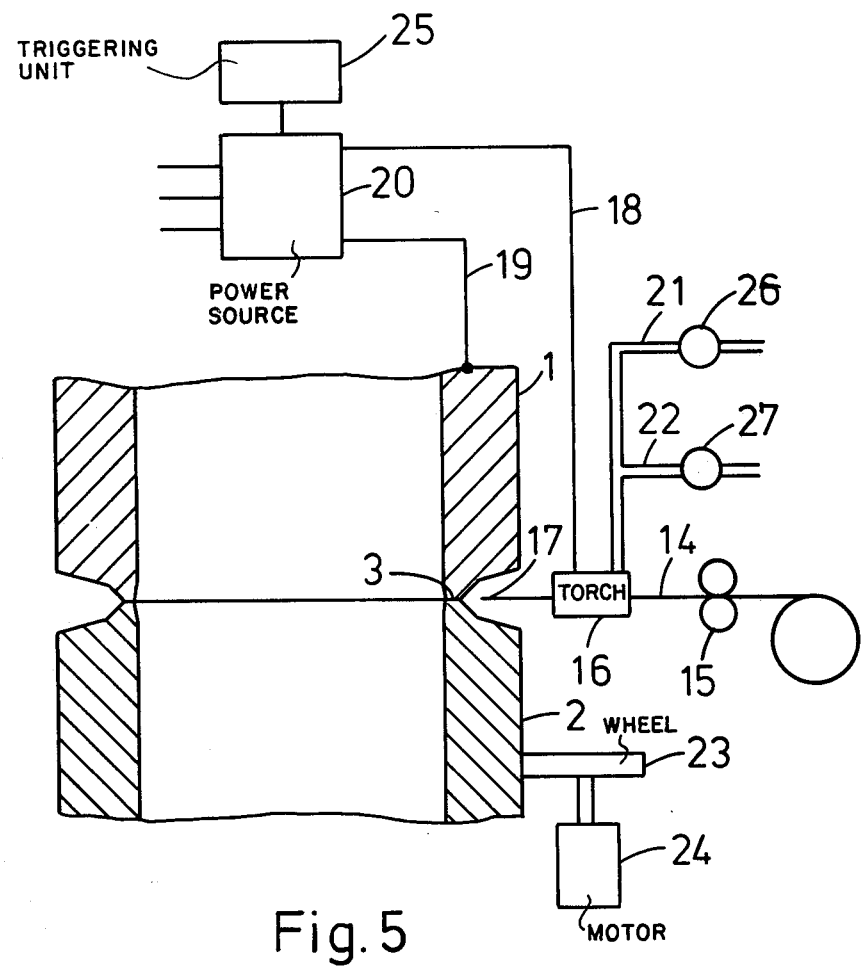

These and other objects of this invention will become clear from the following description taken in conjunction with the drawings illustrating a preferred application of the invention wherein:

FIG. 1 shows a cross-sectional view of an edge preparation of a groove of this invention, FIGS. 2–4 show the groove after the deposit of the first, second and third pass, respectively, FIG. 5 shows schematically a typical relationship of a welding unit to the tubular members for carrying out the invention in making butt welds.

DESCRIPTION OF THE INVENTION

FIG. 1 shows a groove in the wall of two vertically disposed steel tubes 1, 2. The groove is symmetrical and provided with a root face 3 having a width c. Adjacent to the root face 3 an inner portion 4 of the edges is beveled to an angle v. The inner portion is adjacent to an outer portion 5 beveled to an angle u and extending to the outside of the tube. The distance between the site of transition of the inner and outer portion of the edge and the plane defined by the square edge of the root face is designated by the letter d. A flat chamfer 6 on the inside of the tubes facilitates the alignment of the tubes before welding, especially when the tubes are not quite round or their wall thicknesses show a slight difference. The root faces of the tubes are disposed in closely spaced relationship and facing one another so that the gap between them is not larger than 1.5 mm.

The first pass 7 is deposited by shielded-gas arc welding. An electrode 14 is fed by a feeding unit 15 through a welding torch 16 into the groove. When depositing the first pass, the tip 17 of the electrode is held in the plane of the square edge of the root face 3. The welding power is supplied to the welding site by a welding cable 18 and a work connection 19 from a welding power source 20 provided with controlled rectifier valves. A shielding gas mixture is supplied to the welding torch 16 and the groove by hoses 21, 22 connected through valves 26, 27 to gas sources not shown for argon and carbon dioxide. The tubes 1, 2 are rotated by a schematically shown friction wheel 23 engaging the outside of tube 2 and driven by a motor 24. If the tubes cannot be rotated, the welding unit is moved along the periphery of the tubes.

The welding voltage is alternately changed between a high and a low level with the aid of an adjustable triggering unit 25 which supplies pulses to the controlled rectifier valves for adjusting the welding voltage in a known manner. The frequency of the voltage alternation is in the range of 0.5 to 2.0 Hz. The high voltage is adjusted to produce a metal transfer between the electrode and the workpiece in form of droplets, and the low voltage is adjusted to produce a metal transfer only under short-circuit conditions between the electrode and the workpieces. These welding conditions result in a root pass of very high quality. The root penetration is quite enough to produce a flat weld face on the inside of the tubes. The weld face is practically in line with the inner surface and therefore the root pass does not diminish the inner sectional area of the tubes.

A second pass 8 and a third pass 9 are deposited adjacent to the root bead 7. It has been shown that a very good penetration of these two passes can be achieved when only carbon dioxide is used as shielding gas and the voltage is alternated in the same way as during the deposit of the root pass.

The filling passes 10, 11, 12, 13 are deposited in the named numeral order by using a known gas-shielded arc welding technique without voltage alternation.

The following examples are illustrative of the butt welding method of the invention without in any way being limiting:

---
Measures of the groove
c: 0.5 – 3.0 mm
d: not less than 3.5 mm
u: 40° – 50°
v: min. 10° but not more than u
root gap: not more than 1.5 mm.
Welding parameters for the first pass:
Frequency of voltage alternation: 0.5 – 2.0 Hz
Low welding voltage level: 22 – 26 V D.C.
High welding voltage level: 36 – 40 V D.C.
Duration of the high voltage
Level per alternation period
─────────────────────────── 0.3 – 0.4
Duration of alternation period
Shielding gas: 0 – 40 % $CO_2$, remainder Ar
Electrode diameter: not more than abt. 1.0 mm
Deposition rate of metal: 0.15 – 0.35 grams/mm length of the pass
---

Optionally for the passes adjacent to the root bead:

The same welding parameters as above are preferred. However, carbon dioxide is solely used as shielding gas. When welding steel tubes having an inner diameter of 100 mm and a wall thickness of 17 mm the following values have been preferred:

---
Measures of the groove: c = 1.5 mm, d = 4,5 mm, u = 45°, v = 15°, root gap = 0 mm.
First pass:
Frequency of voltage alternation: 1.25 Hz
Low voltage level: 24 V D.C.
High voltage level: 38 V D.C.
Welding current: appr. 190 A
Duration of alternation period: 0.8 seconds
Duration of high voltage level: 0.3 seconds
Shielding gas: 20% $CO_2$ + 80% Ar
Electrode diameter: 0.8 mm
Electrode feeding speed: 17.5 m/min.
Welding speed: 350 mm/min.
Deposition rate of metal: 0.20 grams per mm length of the pass
Second and third pass:
The same parameter as at the first pass, however, 100% $CO_2$ as shielding gas.
Filling passes:
Short-circuit arc welding.
Welding voltage: 24 V D.C.
Shielding gas: 20% $CO_2$ + 80% Ar.
---

We claim:

1. A method of butt welding a pair of vertically disposed, ferrous, tubular members having a wall thickness of more than 12 mm in end-to-end relationship by multipass gas-shielded arc welding with a consumable electrode from the outer side of the tubular members without using a backing member, comprising the steps of (a) preparing the opposed edges of the tubular members by forming a root face on each of the opposed edges the width of which being in the range of 0.5 to 3.0 mm, beveling each of the opposed edges adjacent to the root face to a bevel angle in the range of 40° to 50°, coaxially aligning said tubular members so that the root faces of each of said tubular members are disposed in closely spaced relationship opposite and facing one another and so that said opposed beveled edges define a groove, the gap between the root faces being not larger than 1.5 mm, (b) performing a root pass by continuously feeding an electrode into the groove with its tip parallel with the root face, the diameter of said electrode being not larger than about 1.0 mm, supplying shielding gas consisting of 0–40% carbon dioxide and the balance argon, energizing an arc between the electrode and the root face, alternately changing the voltage supplied to the arc between a low value and a high value at a frequency of alternation in the range of 0.5 to 2.0 Hz, adjusting the low voltage to produce a droplet transfer of the metal from the electrode into the groove during short-circuit periods, adjusting the high voltage to produce a spray transfer of the metal, adjusting the welding speed and the electrode feeding speed to deposit metal in the groove in the range of 0.15 to 0.35 grams per mm length of the pass, and (c) Successively depositing overlapping passes by gas-shielded arc welding for filling the groove.

2. A method according to claim 1, wherein the frequency of the periodical voltage alternation while performing the root pass is adjusted in such a way that the length of the root pass deposited during one period of the voltage alternation is between 4 and 7 mm.

3. A method according to claim 1 wherein the high voltage while performing the root pass is supplied during 30 to 40% of the duration time of one period of the voltage alternation.

4. A method according to claim 3 wherein the duration for one period of the voltage alternation while performing the root pass is 0.8 seconds and the high voltage is supplied during 0.3 seconds of the said period.

5. A method according to claim 1 wherein the shielding gas while performing the root pass consists of 5–40% carbon dioxide and the balance argon.

6. A method according to claim 1 wherein the low voltage while performing the root pass is between 22 and 26 volts and the high voltage while performing the root pass is between 36 and 40 volts.

7. A method according to claim 1 wherein the overlapping passes adjacent to the root pass are deposited by feeding an electrode having a diameter not larger than 1.0 mm into the groove, supplying shielding gas consisting of 0–95% argon and the balance carbon dioxide, energizing an arc between the electrode and the root pass, alternately changing the voltage supplied to the arc between a low value and a high value at a frequency of alternation between 0.5 and 2.0 Hz, adjusting the low voltage to produce a droplet transfer of the metal from the electrode into the groove during short circuit periods, and adjusting the high voltage to produce a spray transfer of the metal.

8. A method according to claim 7 wherein the shielding gas consists essentially of carbon dioxide.

* * * * *